United States Patent
Kobayashi

(10) Patent No.: US 6,394,787 B1
(45) Date of Patent: May 28, 2002

(54) MOLD CLAMPING APPARATUS

(75) Inventor: Sentaro Kobayashi, Nagano-ken (JP)

(73) Assignee: A. K. Technical Laboratory, Inc., Nagano-Ken (JP)

( * ) Notice: Subject to any disclaimer, the term of this patent is extended or adjusted under 35 U.S.C. 154(b) by 0 days.

(21) Appl. No.: 09/583,798

(22) Filed: May 31, 2000

(30) Foreign Application Priority Data

May 31, 1999 (JP) .............................. 11-152888

(51) Int. Cl.⁷ .............................. B29C 45/67
(52) U.S. Cl. .................. 425/577; 425/590; 425/595
(58) Field of Search .................. 425/577, 589, 425/590, 595, 450.1, 451.2, 451.9

(56) References Cited

U.S. PATENT DOCUMENTS

| | | | | |
|---|---|---|---|---|
| 4,380,427 A | * | 4/1983 | Hehl | 425/590 |
| 5,052,909 A | * | 10/1991 | Hertzer et al. | 425/589 |
| 5,052,910 A | * | 10/1991 | Hehl | 425/589 |
| 5,232,718 A | * | 8/1993 | Miyazawa et al. | 425/577 |

FOREIGN PATENT DOCUMENTS

| | | |
|---|---|---|
| EP | 426096 | 5/1991 |
| EP | 665093 | 8/1995 |
| FR | 2102362 | 4/1972 |
| GB | 1 357 956 | 6/1974 |
| JP | 7186221 | 11/1995 |
| JP | 2832263 | 10/1998 |

* cited by examiner

*Primary Examiner*—James P. Mackey
(74) *Attorney, Agent, or Firm*—Weingarten, Schurgin, Gagnebin & Lebovici LLP

(57) ABSTRACT

A mold clamping apparatus in which hydraulic oil that is forcibly discharged into hydraulic lines from one of two kinds of cylinders, that is, a differential mold clamping cylinder and a mold clamping oil chamber of a mold opening/closing cylinder, is, in an alternating manner, provided to the other cylinder as its operating oil. This feature enables the simultaneous operation of the two kinds of cylinders as well as reduction in operating time in which the mold is opened or closed. The mold clamping apparatus includes a stationary mold, a movable mold which closes with respect to the stationary mold, a core movable through the movable mold into and out of the stationary mold. The movement of the core into and out of the stationary mold is effected by a differential mold clamping cylinder which is separate from a mold opening/closing cylinder for the movable mold and is fitted with a booster ram. A hydraulic line on the mold opening side of the mold opening/closing cylinder and a hydraulic line for the differential mold clamping cylinder are interconnected to one another via a communication passage with a pressure/flow control valve disposed thereon. While the movable mold is opened and closed and the core is moved into and out of the stationary mold, a volume of hydraulic oil that is discharged into these hydraulic lines is alternately provided to the mold opening oil chamber or to the differential mold clamping cylinder.

3 Claims, 3 Drawing Sheets

Fig. 1(A) Prior Art
Fig. 1(B) Prior Art
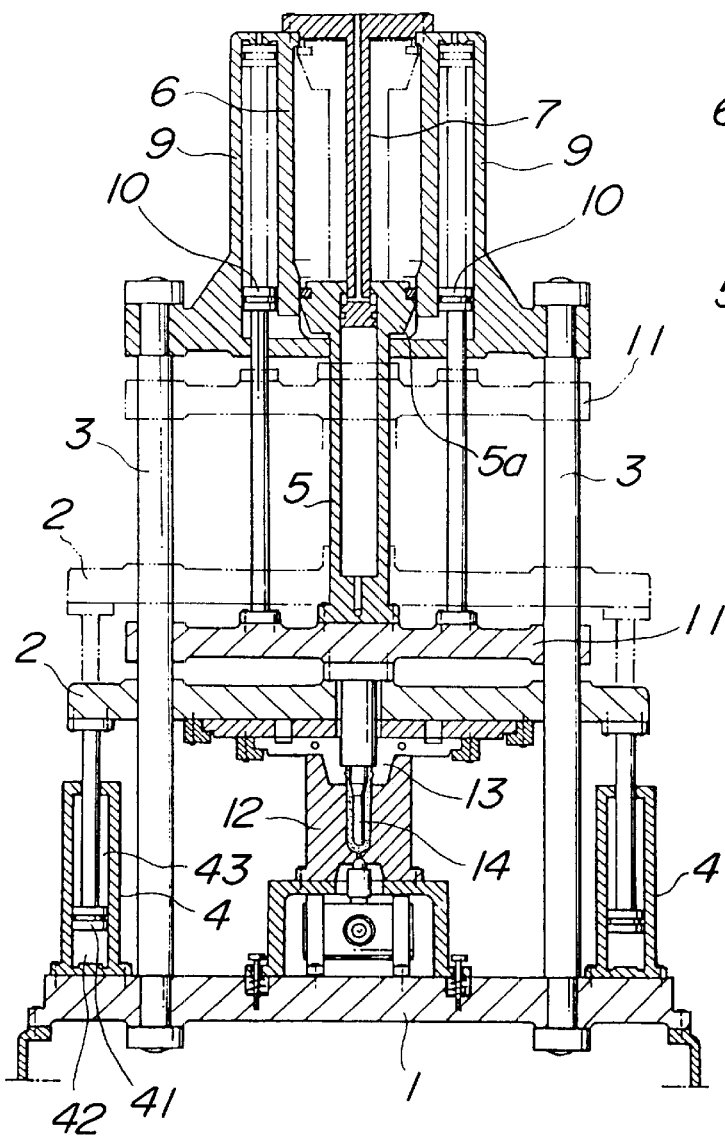
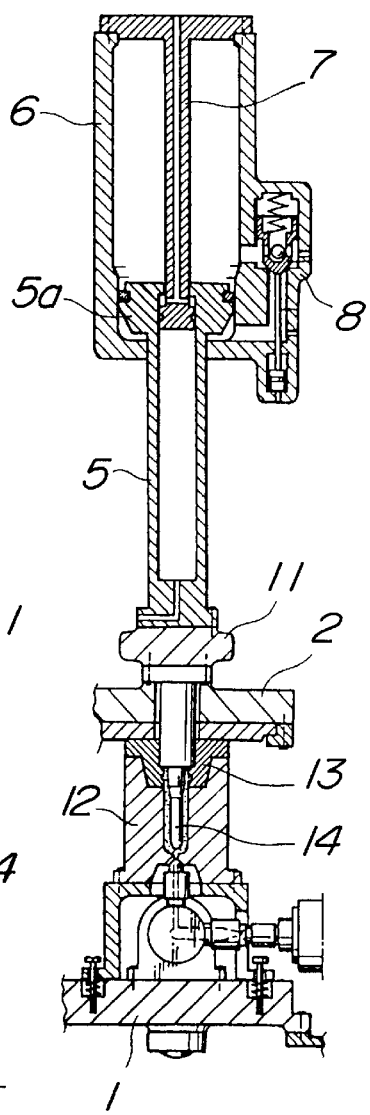

US 6,394,787 B1

MOLD CLAMPING APPARATUS

BACKGROUND OF THE INVENTION

1. Field of the Invention

The present invention relates to a mold clamping apparatus, and more particularly, to a mold clamping apparatus having a movable core for use in injection molding for making molded products such as preforms, which clamping apparatus includes hydraulic circuits that enable reduced operating time in which molds are opened and closed.

2. Description of the Prior Art

The mold clamping apparatus of the type having a stationary mold to form a body of molded products, a movable mold which closes with respect to the stationary mold to form an opening in molded products, and a core which is placed in the stationary mold through the movable mold and is movable into and out of the stationary mold includes those employed in rotary type injection machines disclosed in the publication of Japanese Patent No. 2, 832, 263 which is incorporated herein by reference. In such a mold clamping apparatus, a mold opening/closing cylinder effects opening and closing of the movable mold, and the movement of the core into and out of the stationary mold is effected by a differential mold clamping cylinder, which is separate from the mold opening/closing cylinder and is fitted with a booster ram.

Referring to FIGS. 1(A) and 1(B), the above-described conventional clamp apparatus is shown having a machine bed 1, a movable platen 2, a pair of tie bars 3, 3, a pair of mold opening/closing cylinders 4, 4, and a differential mold clamping cylinder 6. The tie bars 3, 3 are vertically mounted on the machine bed 1 and penetrate through the opposite ends of the movable platen 2 which is movable upward and downward. The mold clamping cylinders 4, 4 are arranged between the movable platen 2 and the machine bed 1 and cause the movable platen 2 to move upward and downward as a piston 41 in each of the cylinders moves upward and downward. Arranged on the upper ends of the tie bars 3, 3 is the differential mold clamping cylinder 6 which accommodates a mold clamping ram 5. The mold clamping ram 5, which is arranged above the movable platen 2, is directed downward.

A mold clamping piston 5a is arranged in the differential mold clamping cylinder 6. The inside of the cylinder 6 has a relatively larger inner diameter than the outer diameter of the piston 5a in the area above the mold clamping position, such that the piston 5a contacts the inner surface of the cylinder only in the lower-most region of the cylinder to effect mold clamping. This leaves a communication gap about the piston 5a in the upper region of the cylinder. A booster ram 7 is inserted into the above-described mold clamping ram 5 from the upper end of the mold clamping ram. Arranged on the sides of the cylinder 6 are a bypass 8 which connects the upper region of the cylinder 6 to the lower region thereof and a pair of charge cylinders 9, 9 which communicate with the cylinder 6 at the lower end thereof. Pistons 10, 10 are arranged in the charge cylinders 9, 9, respectively. Also, arranged above the movable platen 2 is a mold clamping platen 11 through which the tie bars 3, 3 are arranged. The pistons 10, 10 as well as the mold clamping ram 5 are connected to the upper surface of the mold clamping platen 11.

In such a mold clamping apparatus, a stationary mold 12 to form a body of the molded products such as preforms is placed on the upper surface of the machine bed 1, and a movable mold 13 to form an opening in the molded products is fixed to the lower surface of the movable platen 2. Also, a core 14 to define an inner space in a preform is arranged on the lower surface of the mold clamping platen 11 such that it can move through the movable mold 13 into and out of a cavity defined inside the stationary mold 12.

Opening of the movable mold 13 with respect to the stationary mold 12 is effected by supplying hydraulic oil to a mold opening oil chamber 42 which is defined by a piston 41 in the lower region of the mold opening/closing cylinder 4, while closing of the movable mold 13 with respect to the stationary mold 12 is effected by supplying hydraulic oil to a mold closing oil chamber 43 which is defined in the upper region of the mold opening/closing cylinder 4.

Opening of the core 14 is effected by supplying hydraulic oil from the booster ram 7 to the mold clamping ram 5. Closing and clamping of the core 14 are effected by supplying hydraulic oil to the differential mold clamping cylinder 6. When inside of the differential mold clamping cylinder 6 is pressurized, the mold clamping piston 5a is pushed downward due to the difference in area between the upper surface and the lower surface of the piston to which the pressure applies. This in turn moves the mold clamping ram 5 downward. Upon this, the hydraulic oil that is present below the mold clamping piston 5a flows through the communication gap, around the piston, to above the piston. Thus, no hydraulic resistive force is exerted while the mold clamping piston 5a is moving downward. After the mold clamping piston 5a fits in the lower-most region of the cylinder 6, however, pressure builds up in the cylinder in the same manner as in a typical mold clamping cylinder. This clamps the molds.

This differential mold clamping cylinder 6 has the characteristics that the high-speed mold closing as well as mold clamping can be effected with a small supply of hydraulic oil. In contrast, in the mold opening/closing cylinder 4, which is of a typical construction and includes the two oil chambers 42, 43 defined by the piston 41, the speed at which the molds are closed and opened is varied depending on the discharge volume of the hydraulic pumps connected to the cylinder. The pump discharge volume needs to be increased in order to make the opening of the mold by the mold opening/closing cylinder 4 faster. Therefore, it has been difficult to shorten the length of the time it takes for the molds to open, or to close, by simultaneously operating the mold opening/closing cylinder 4 and the differential mold clamping cylinder 6, each of which employs different system.

SUMMARY OF THE INVENTION

The present invention addresses the above-mentioned problem associated with the differential mold clamping cylinder utilized. Accordingly, it is an object of the present invention to provide a novel mold clamping apparatus in which the hydraulic oil forcibly discharged from one of the differential mold clamping cylinder and the mold opening oil chamber of the mold opening/closing cylinder is delivered to the other as their operating oil in an alternating manner, whereby the simultaneous operation of the two kinds of cylinders, which has been regarded as difficult until now, is realized, leading to reduction in the operating time required for the molds to open and close.

According to the present invention, there is provided a mold clamping apparatus comprising a bed on which a stationary mold to form a body of a product to be molded is placed; a pair of tie bars vertically arranged on the bed; a movable platen having each of the tie bars arranged through the opposite ends thereof, and having on its lower surface a movable mold which closes with respect to the stationary mold to form an opening in molded products; a mold opening/closing cylinder arranged between the bed and the movable platen, wherein the mold opening/closing cylinder moves the movable platen upward and downward to effect the opening and closing of the movable mold, wherein the mold opening/closing cylinder includes a mold opening oil chamber and a mold closing oil chamber, each of the oil chambers defined by a piston, and wherein the mold opening/closing cylinder has a hydraulic line for supplying/discharging hydraulic oil to/from each of the oil chambers; a mold clamping platen having a core movable into and out of the stationary mold through the movable platen; and a differential mold clamping cylinder arranged on the upper end of the tie bars and having a mold clamping ram directed downward, wherein the mold clamping ram has a booster ram inserted there into from the upper end thereof, and wherein the mold clamping ram is connected to the upper surface of the mold clamping platen and has a hydraulic line for supplying/discharging hydraulic oil to/from the booster ram and a hydraulic line for supplying/discharging hydraulic oil to/from the differential mold clamping cylinder; wherein the movable platen is moved upward and downward by supplying/discharging hydraulic oil to/from the mold opening/closing cylinder and opening and closing as well as clamping of the mold clamping platen are effected by supplying/discharging hydraulic oil to/from the differential mold clamping cylinder. In the mold clamping apparatus, the hydraulic line which is in communication with the mold opening oil chamber of the mold opening/closing cylinder and the hydraulic line for the differential mold clamping cylinder are connected to one another via a communication passage, and in that a volume of hydraulic oil which is discharged into the hydraulic lines as the movable mold is opened and closed and as the core moves into and out of the stationary mold is alternately provided to the mold opening chamber of the mold opening/closing cylinder and the differential mold clamping cylinder.

Preferably, a pressure/flow control valve is arranged on the communication passage for controlling the pressure as well as the flow of the hydraulic oil that flows out into the hydraulic lines.

Also, it is preferred that the abed of hydraulic oil that is discharged from the mold opening/closing cylinder is substantially the same as the abed of hydraulic oil that is discharged from the differential mold clamping cylinder.

The present invention, which is characterized in that hydraulic oil discharged from the differential mold clamping cylinder and hydraulic oil discharged from the mold clamping oil chamber of the mold opening/closing cylinder are shared by the two kinds of cylinders as operating oil in an alternating manner, has an advantage that it is not necessary to increase the discharge volume of the pump in order to increase the operating speed of the mold opening/closing cylinder to open and close the mold and the abed of hydraulic oil that is drained is relatively small. Thus, even in a mold clamping apparatus of the type which utilizes a differential mold clamping cylinder operative in a differential manner with a small abed of hydraulic oil to open and close a core as well as to clamp molds and utilizes a mold opening/closing cylinder which is of a normal configuration and requires a large abed of hydraulic oil to open and close a movable mold, the simultaneous operation of the two kinds cylinders, which has been difficult until now, is achieved. Accordingly, it is possible to shorten the molding cycle by reducing the length of the time required for the molds to open and close. Further, the simple configuration of the mold clamping apparatus according to the present invention in which two hydraulic lines, i.e., one for the differential mold clamping cylinder and the other for the mold opening oil chamber of the mold opening/closing cylinder, are interconnected via a communication passage will not make the hydraulic circuit particularly complex and is readily applicable to the existing hydraulic circuits. With a pressure/flow control valve arranged on the communication passage, the mold clamping apparatus of the present invention can be easily controlled. Finally, by making the abed of oil discharged from one of the two kinds of cylinders the same as the abed of oil discharged from the other cylinder, the required abed of operating oil is substantially supplemented by the hydraulic oil discharged from each cylinder. This maximizes the efficiency of the system by minimizing the abed of hydraulic oil that is drained or needs to be added by a pump.

BRIEF DESCRIPTION OF THE DRAWINGS

These and other objects and advantages of the present invention will become clear from the following description with reference to the accompanying drawings, wherein:

FIGS. 1(A) and 1(B) are a longitudinal cross-sectional front view and longitudinal cross-sectional side view of a mold clamping apparatus of the type addressed by the present invention, respectively;

DETAILED DESCRIPTION OF THE PREFERRED EMBODIMENTS

The present invention will now be described in detail hereinafter with reference to the accompanying drawings.

Figure 2:
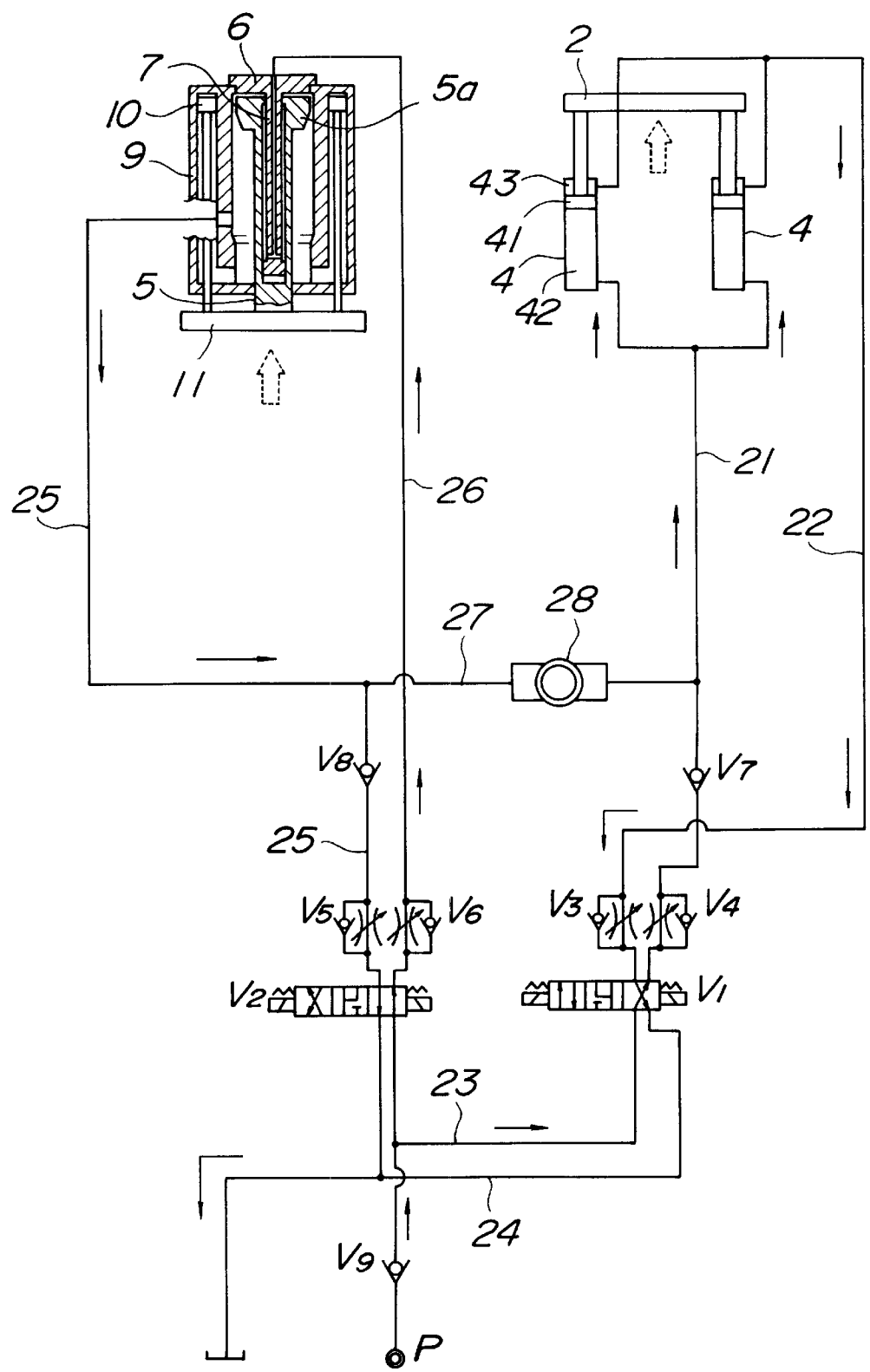
FIG. 2 shows hydraulic circuits in a mold clamping apparatus according to the present invention, when molds are closed.
Figure 3:
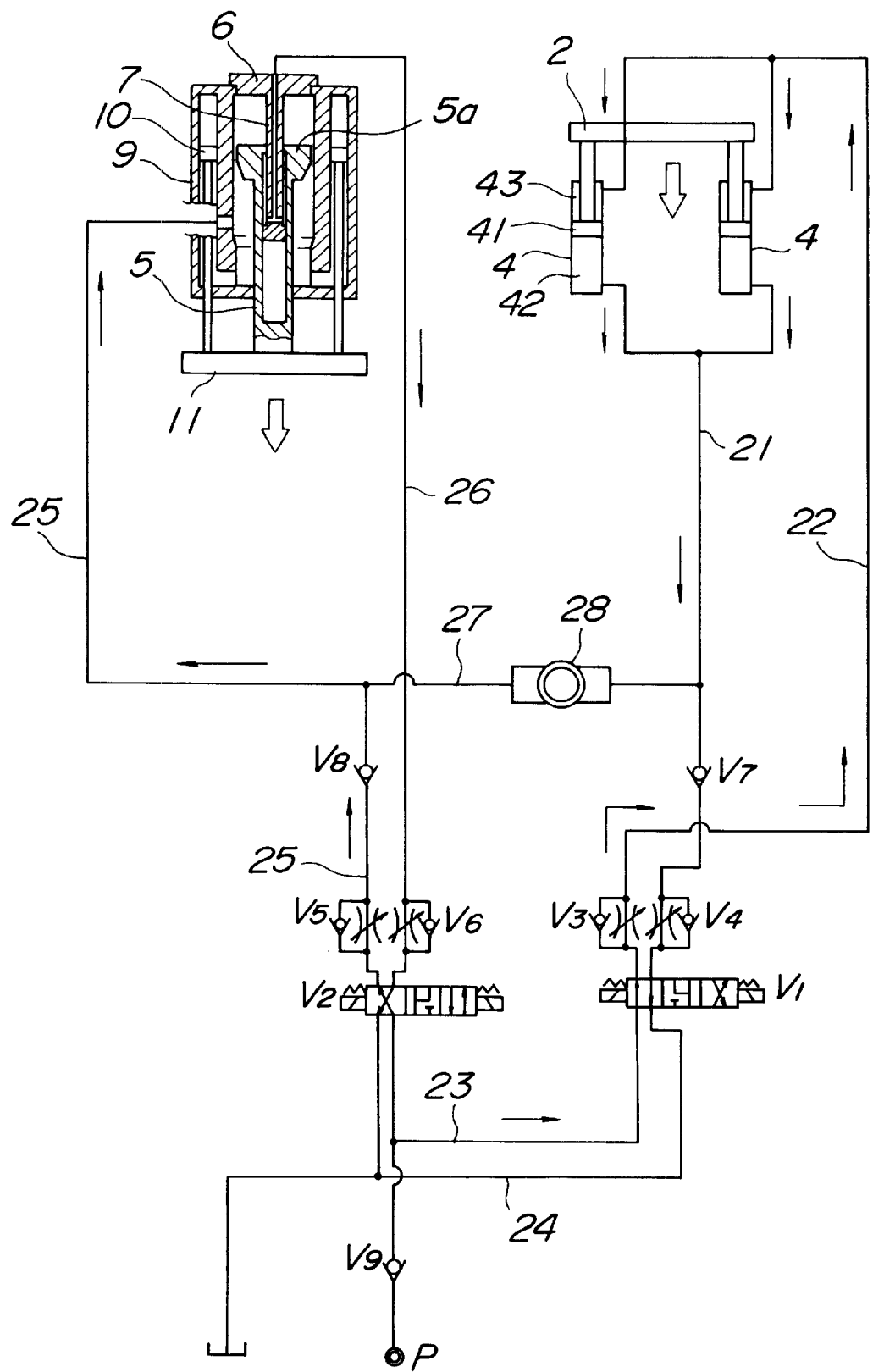
FIG. 3 shows hydraulic circuits in a mold clamping apparatus according to the present invention, when molds are opened.

Referring to FIGS. 2 and 3, an exemplary hydraulic circuit employed in a mold clamping apparatus in accordance with the present invention is shown. As shown, the reference numerals 21, 22 denote a hydraulic line on the mold opening side and a hydraulic line on the mold closing side of the mold opening/closing cylinder 4, respectively. A solenoid switching valve V1 for switching connections between a main line 23 which is connected to a pump P and a drain line 24 is arranged on the hydraulic lines 21, 22.

The reference numerals 25, 26 denote a hydraulic line for a differential mold clamping cylinder 6 and a hydraulic line for a booster ram 7, respectively. A solenoid switching valve V2 for switching connections between a main line 23 connected to a pump P and a drain line 24 is arranged on the hydraulic lines 25, 26.

A communication passage connects the hydraulic line 21 to the hydraulic line 25 for the differential mold clamping cylinder 6 and is designated by the reference numeral 27. In the present invention, this communication passage serves as a hydraulic passage which, in an mold closing operation, supplies the differential mold clamping cylinder 6 with the operating oil, i.e., the hydraulic oil that has flown out from a mold opening oil chamber 42 of the cylinder 4 into the hydraulic line 21 and, in an mold opening operation, supplies the mold opening oil chamber 42 with the operating oil, i.e., the hydraulic oil that has flown out from the differential mold clamping cylinder 6 into the hydraulic line 25. A pressure/flow control valve 28 is arranged on the communication passage 27 for controlling the pressure and the flow of the hydraulic oil flowing therethrough. This control valve 28 may be a single valve having its expected function, or a composite unit consisting of multiple switching valves and relief valves.

Valves V3, V4, V5 and V6 are check valve-equipped flow adjustment valves disposed on the aforementioned hydraulic lines 21, 22, 25 and 26, respectively. Valves V7, V8 and V9 are check valves disposed on the hydraulic line 21 on the side of the cylinder 4, on the main line 23, and on the hydraulic line 25 on the side of the differential mold clamping cylinder 6, respectively.

Operation of the above-described hydraulic circuit will now be described.

First, the solenoid switching valves V1 and V2, which are shown in FIG. 2 in a state in which mold opening has been completed, are together switched from the right port to the left port, as shown in FIG. 3. This connects the hydraulic line 22 for the mold closing oil chamber 43 of the mold opening/closing cylinder 4 to the main line 23 for the pump P. Also, the hydraulic line 25 for the differential mold clamping cylinder 6 connects to the main line 23 for the pump P, and the hydraulic line 26 for the booster ram 7 connects to the drain line 24.

From the pump P, hydraulic oil is supplied to the mold closing oil chamber 43. This causes the piston 41 to move downward, which in turn forces out the hydraulic oil in the mold opening oil chamber 42 into the hydraulic line 21. In the booster ram 7, the hydraulic resistivity in the upper chamber is removed, and the differential mold clamping cylinder 6 is provided by the pump P with hydraulic oil, the flow abed of which has been limited to a small abed by the flow adjustment valve V5.

During this process, the hydraulic oil which has been pressurized by the piston 41 and has flown out into the hydraulic line 21 flows through the communication passage 27, is combined with the hydraulic oil from the pump P, and is then delivered to the mold clamping cylinder 6 as operating oil. The resulting pressure difference acting on the mold clamping piston 5a causes it to move downward in the differential mold clamping cylinder 6. As a result, the mold clamping platen 11 closes with respect to the core 14, as shown in FIG. 1(A). Meanwhile, the piston rod in the mold opening/clamping cylinder 4 contracts into the mold opening/clamping cylinder 4, which moves the movable platen 2 downward until the movable platen 13 abuts the upper surface of the stationary mold 12. With a delay, the core 14 starts to move down, penetrates through the movable mold 13, and is then positioned at the center of the cavity in the stationary mold 12. This is followed by urging of mold clamping plate 11 against the movable platen 2 to effect mold clamping.

When the mold clamping is completed as shown in FIG. 3, the solenoid switching valves V1, V2 are together switched from their respective left ports to the right ports. The switching opens connection between the hydraulic line 22 for the mold closing oil chamber 43 in the mold opening/closing cylinder 4 and the drain line 24 and connection between the hydraulic line 21 for the mold opening chamber 42 in the mold opening/closing cylinder 4 and the main line 23. Also, the hydraulic line 26 for the booster ram 7 connects to the main line 23.

As a result of the switching, hydraulic oil is provided to the upper chamber within the mold clamping ram 5 which has extended out from the differential mold clamping cylinder 6 in the mold closing operation, causing the mold clamping ram 5 to retract into the cylinder. The core 14, along with the mold clamping platen 11, then moves upward and out from the stationary mold 12. During this, the same abed of hydraulic oil as was provided in the mold closing operation is pushed out from the differential mold clamping cylinder 6 into the hydraulic line 25, flows through the communication passage 27 and hydraulic line 21, and is then, together with the hydraulic oil from the pump P, provided to the mold opening chamber 42 in the mold opening/closing cylinder 4. This makes it possible for the mold opening/closing cylinder 4 to effect the high-speed mold opening without the need to increase the discharge volume of the pump P.

An excessive abed of operating oil results due to the fact that there is a difference in volume between the differential cylinder 6 and the mold opening oil chamber 42 when hydraulic oil flows. This excessive operating oil is controlled by the pressure/flow control valve 28 and is discharged into the drain line 24, if necessary. The discharging to the drain line 24 may also be utilized when hydraulic oil is provided from the mold opening oil chamber 42 to the differential mold clamping cylinder 6. The drainage is controlled by the pressure/flow control valve 27 arranged on the communication passage 28. Accordingly, it is only necessary to supply an abed of oil sufficient to compensate for the depletion.

EXAMPLE

An illustrative example of the volume of one embodiment of the differential mold clamping cylinder as well as the mold opening/closing cylinder according to the present invention is shown below. It is, however, to be understood that the embodiment is not intended to limit the invention in any sense.

| | | | stroke |
|---|---|---|---|
| differential mold clamping cylinder | inner diameter | 220 mm | 580 mm |
| mold clamping ram | outer diameter | 150 mm | |
| booster ram | outer diameter | 70 mm | |
| charge cylinder | inner diameter | 100 mm | 580 mm |
| charge cylinder piston rod | outer diameter | 55 mm | |
| mold opening/closing cylinder | inner diameter | 60 mm | 380 mm |
| mold opening/closing cylinder piston rod | outer diameter | 40 mm | |

| | |
|---|---|
| volume of differential mold clamping cylinder (as measured when mold is closed) | 198.0 L |
| volume of differential mold clamping cylinder (as measured when mold is opened) | 118.0 L |
| volume difference | 80.0 L |
| volume of charge cylinder (combined volume of two cylinders) | 63.5 L |
| depletion after supplementation by charge cylinders | 16.5 L |
| volume of mold opening/closing cylinder (combined volume of three cylinders) | 17.9 L |

As can be seen from the tables above, operating oil for the differential mold clamping cylinder can be supplemented by the hydraulic oil from the mold opening/closing cylinder. Also, it was observed that the mold opening/closing operation was made faster by as much as almost two seconds and simultaneous operation of the cylinders was achieved. This is considered to be due to the fact that the time lag that arises because the hydraulic oil is supplied from the pump is diminished.

While the presently preferred embodiment of the present invention has been shown and described, it will be understood that the present invention is not limited thereto, and that various changes and modifications may be made by those skilled in the art without departing from the scope of the invention as set forth in the appended claims.

What is claimed is:

1. A mold clamping apparatus comprising:
   a bed on which a stationary mold to form a body portion of a product to be molded is placed;
   a pair of tie bars vertically arranged on the bed;
   a moveable platen having each of the tie bars arranged through the opposite ends thereof, and having on its lower surface a movable mold which closes with respect to the stationary mold to form a mold cavity which defines the exterior surface of the molded product;
   a mold opening/closing cylinder arranged between the bed and the movable platen, the mold opening/closing cylinder moves the movable platen upward and downward to effect the opening and closing of the movable mold, the mold opening/closing cylinder including a mold opening oil chamber and a mold closing oil chamber, each of the oil chambers defined by a piston, the mold opening/closing cylinder having a hydraulic line for supplying/discharging hydraulic oil to/from each of the oil chambers;
   a mold clamping platen having a core movable into and out of the stationary mold through the movable platen; and
   a differential mold clamping cylinder arranged on the upper end of the tie bars and having a mold clamping ram directed downward, the mold clamping ram having a booster ram inserted there into from the upper end thereof, the mold clamping ram being connected to the upper surface of the mold clamping platen and having a hydraulic line for supplying/discharging hydraulic oil to/from the booster ram and a hydraulic line for supplying/discharging hydraulic oil to/from the differential mold clamping cylinder;
   wherein the moveable platen is moved upward and downward by supplying/discharging hydraulic oil to/from the mold opening/closing cylinder and opening and closing as well as clamping of the mold clamping platen are effected by supplying/discharging hydraulic oil to/from the differential mold clamping cylinder; and
   wherein the hydraulic line which is in communication with the mold opening oil chamber of the mold opening/closing cylinder and the hydraulic line for the differential mold clamping cylinder are connected to one another via a communication passage, and a volume of hydraulic oil which is discharged into the hydraulic lines as the moveable mold is opened and closed and as the core moves into and out of the stationary mold is alternately provided to the mold opening chamber of the mold opening/closing cylinder and the differential mold clamping cylinder.

2. The mold clamping apparatus according to claim 1, wherein a pressure/flow control valve is arranged on the communication passage for controlling the pressure as well as the flow of the hydraulic oil which flows out into the hydraulic lines.

3. The mold clamping apparatus according to claim 1, wherein the volume hydraulic oil that is discharged from the mold opening/closing cylinder is substantially the same as the volume of hydraulic oil that is discharged from the differential mold clamping cylinder.

* * * * *